UNITED STATES PATENT OFFICE.

EMIL F. DIETERICHS, OF PHILADELPHIA, PENNSYLVANIA.

IMPROVEMENT IN WATER-REPELLENT LEATHER-DUBBING.

Specification forming part of Letters Patent No. 171,719, dated January 4, 1876; application filed May 11, 1875.

CASE A.

*To all whom it may concern:*

Be it known that I, EMIL F. DIETERICHS, of Philadelphia, Pennsylvania, have invented a new manufacture, which I denominate "Alumina Oil," of which the following is a specification:

This oil preparation is an improvement on the water-repellent dubbing for which Letters Patent No. 150,303 were granted to me on the 28th April, 1874, and is intended to be used for stuffing and dressing leather, and for application to leather in manufactured stock.

I employ neat's-foot oil, fish-oils, lard-oil, olive-oil, or any other fat or fatty oils containing the oleic, margaric, or other fatty acids, and treat them with any of the alkalies to a combination as nearly neutral as possible, and, after diluting the compound with hot water, precipitate the same with a solution of alum, or any of the alumina salts. The resulting pasty mass may be thrown on a filter and washed. Fish-oil or neat's-foot oil is then heated until all the watery and glutinous impurities are expelled, and then any desired amount of the above-described pasty mass, in the proportion of about sixteen (16) ounces of the alumina compound to every gallon of oil, is dissolved therein, heating and stirring being continued until all watery scum has disappeared, and a uniform oily mixture is obtained.

The proportions of the alumina compound and the oil above stated produce the most satisfactory results; but these proportions may be varied, inasmuch as any quantity of the alumina compound produces a beneficial effect, an excess of it having no deleterious influence on the leather.

I claim—

As a new manufacture, oil preparation consisting of an alumina compound insoluble in water, dissolved in oil or fatty matter, substantially as set forth, for the purpose specified.

E. F. DIETERICHS.

Witnesses:
  J. E. SHAW,
  S. A. STEVENS.